(12) United States Patent
Choi et al.

(10) Patent No.: US 10,793,441 B2
(45) Date of Patent: Oct. 6, 2020

(54) METHOD FOR PREPARING ALUMINOSILICATE PARTICLES HAVING EXCELLENT DISPERSION, REINFORCING MATERIAL FOR RUBBER COMPRISING THE ALUMINOSILICATE PARTICLES, AND RUBBER COMPOSITION FOR TIRES COMPRISING THE REINFORCING MATERIAL

(71) Applicant: LG Chem, Ltd., Seoul (KR)

(72) Inventors: Kwon Il Choi, Daejeon (KR); Ha Na Lee, Daejeon (KR); Woo Seok Kim, Daejeon (KR); Shin Hee Jun, Daejeon (KR); Myounghwan Oh, Daejeon (KR)

(73) Assignee: LG Chem, Ltd. (KR)

( * ) Notice: Subject to any disclaimer, the term of this patent is extended or adjusted under 35 U.S.C. 154(b) by 112 days.

(21) Appl. No.: 16/089,879

(22) PCT Filed: Oct. 18, 2017

(86) PCT No.: PCT/KR2017/011538
§ 371 (c)(1),
(2) Date: Sep. 28, 2018

(87) PCT Pub. No.: WO2018/084466
PCT Pub. Date: May 11, 2018

(65) Prior Publication Data
US 2020/0010329 A1    Jan. 9, 2020

(30) Foreign Application Priority Data

Nov. 2, 2016  (KR) .................. 10-2016-0145231

(51) Int. Cl.
*C01B 33/26* (2006.01)
*B60C 1/00* (2006.01)
(Continued)

(52) U.S. Cl.
CPC ............... *C01B 33/26* (2013.01); *B60C 1/00* (2013.01); *C08K 3/34* (2013.01); *C08L 7/00* (2013.01);
(Continued)

(58) Field of Classification Search
CPC ..... B60C 1/00; C08K 3/34; C08L 7/00; C08L 9/00; C08L 21/00
See application file for complete search history.

(56) References Cited

U.S. PATENT DOCUMENTS

| 4,213,949 A | 7/1980 | Mahler et al. |
| 4,929,431 A | 5/1990 | Hagiwara et al. |

(Continued)

FOREIGN PATENT DOCUMENTS

| JP | 10510236 A | 10/1998 |
| JP | 2009051715 A | 3/2009 |

(Continued)

OTHER PUBLICATIONS

Extended European Search Report including Written Opinion for Application No. EP17867072.5 dated Apr. 18, 2019.
(Continued)

*Primary Examiner* — Patricia L. Hailey
*Assistant Examiner* — Michael Forrest
(74) *Attorney, Agent, or Firm* — Lerner, David, Littenberg, Krumholz & Mentlik, LLP

(57) ABSTRACT

The present disclosure relates to a method for preparing aluminosilicate particles having excellent dispersion, a reinforcing material for rubber including the aluminosilicate particles, and a rubber composition for tires including the same. The reinforcing material for rubber including the aluminosilicate particles prepared by the method of the present disclosure can exhibit excellent dispersibility in the rubber composition and an enhanced reinforcing effect, so (Continued)

that it can be suitably used in eco-friendly tires requiring high efficiency and high fuel efficiency.

10 Claims, 9 Drawing Sheets

(51) Int. Cl.
    *C08K 3/34*     (2006.01)
    *C08L 7/00*     (2006.01)
    *C08L 9/00*     (2006.01)
    *C08L 21/00*     (2006.01)

(52) U.S. Cl.
    CPC ............... *C08L 9/00* (2013.01); *C08L 21/00* (2013.01); *C01P 2002/70* (2013.01); *C01P 2004/03* (2013.01); *C01P 2004/04* (2013.01); *C01P 2004/20* (2013.01); *C01P 2006/12* (2013.01); *C01P 2006/14* (2013.01); *C01P 2006/16* (2013.01)

(56) References Cited

U.S. PATENT DOCUMENTS

| | | | |
|---|---|---|---|
| 5,674,932 | A | 10/1997 | Agostini et al. |
| 5,858,320 | A | 1/1999 | You |
| 6,200,919 | B1 | 3/2001 | Singh et al. |
| 6,218,329 | B1 | 4/2001 | Singh et al. |
| 2006/0009564 | A1* | 1/2006 | Simonot .............. B60C 1/00 524/442 |
| 2014/0309106 | A1 | 10/2014 | Mikuni et al. |
| 2014/0342156 | A1 | 11/2014 | Seo et al. |
| 2017/0297001 | A1 | 10/2017 | Jung et al. |

FOREIGN PATENT DOCUMENTS

| | | | |
|---|---|---|---|
| JP | 2013095857 A | 5/2013 |
| JP | 2014180602 A | 9/2014 |
| KR | 19980046277 A | 9/1998 |
| KR | 19980063659 A | 10/1998 |
| KR | 20120041399 A | 5/2012 |
| KR | 101337301 B1 | 12/2013 |
| KR | 20140069200 A | 6/2014 |
| KR | 20160046298 A | 4/2016 |
| KR | 20180028927 A | 3/2018 |
| WO | 2015191817 A1 | 12/2015 |

OTHER PUBLICATIONS

International Search Report for Application No. PCT/KR2017/011538 dated Mar. 26, 2018.

Saalwachter, Kay "Microstructure and Molecular Dynamics of Elastomers as Studied by Advanced Loe-Resolution Nuclear Magnetic Resonance Methods", Rubber Chemistry and Technology, vol. 85, No. 3, Sep. 2012, pp.350-386.

Sarkawi et al., "Filler-to-filler and filler-to-rubber interactions in silica-reinforced natural rubber as visualized by tem network visualization", Proceedings 11. Kautschuk Herbst Kolloquium, Hannover, Germany, pp. 1-10, Nov. 26, 2014.

\* cited by examiner

METHOD FOR PREPARING ALUMINOSILICATE PARTICLES HAVING EXCELLENT DISPERSION, REINFORCING MATERIAL FOR RUBBER COMPRISING THE ALUMINOSILICATE PARTICLES, AND RUBBER COMPOSITION FOR TIRES COMPRISING THE REINFORCING MATERIAL

CROSS-REFERENCE TO RELATED APPLICATIONS

The present application is a national phase entry under 35 U.S.C. § 371 of International Application No. PCT/KR2017/011538, filed on Oct. 18, 2017, which claims the benefits of Korean Patent Application No. 10-2016-0145231, filed on Nov. 2, 2016, the disclosures of which are incorporated herein by reference.

TECHNICAL FIELD

The present disclosure relates to a method for preparing aluminosilicate particles having excellent dispersion, a reinforcing material for rubber including the aluminosilicate particles, and a rubber composition for tires including the same.

BACKGROUND OF ART

As concerns about global warming and environmental problems spread, environment-friendly concepts of increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that a highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

PRIOR ART DOCUMENTS

Non-Patent Documents (Non-Patent Document 1) Kay Saalwachter, Microstructure and molecular dynamics of elastomers as studied by advanced low-resolution nuclear magnetic resonance methods, Rubber Chemistry and Technology, Vol. 85, No. 3, pp. 350-386 (2012).

DETAILED DESCRIPTION OF THE INVENTION

Technical Problem

The present disclosure is to provide a method for preparing aluminosilicate particles having excellent dispersion in a rubber composition.

The present disclosure is to provide a reinforcing material for rubber capable of imparting excellent reinforcing effect and processability to tires.

In addition, the present disclosure is to provide a rubber composition for tires including the reinforcing material for rubber.

Technical Solution

According to the present disclosure, a method for preparing aluminosilicate particles is provided, wherein the method includes the steps of:

forming a raw material mixture including a basic or alkaline aqueous solution, a silicon source, and an aluminum source;

curing the raw material mixture to obtain aluminosilicate particles;

washing the aluminosilicate particles;

purifying the washed aluminosilicate particles to remove unreacted sources in the aluminosilicate particles; and drying the purified aluminosilicate particles.

In addition, according to the present disclosure, a reinforcing material for rubber including amorphous aluminosilicate particles having a composition of the following Chemical Formula 1 is provided, wherein the aluminosilicate particles satisfy the following conditions:

in a data plot obtained by X-ray diffraction (XRD), a full width at half maximum (FWHM) in a 2θ range of 20° to 37° is 3° to 8.5°, a maximum peak intensity ($I_{max}$) is in a 2θ range of 26° to 31°, and the aluminosilicate particles exhibit a pattern having no peak of crystalline $SiO_2$ (JCPDS standard pattern number #46-1045), an average particle diameter is 10 to 100 nm, a Brunauer-Emmett-Teller surface area ($S_{BET}$) is 80 to 250 $m^2/g$, and an external specific surface area ($S_{EXT}$) is 60 to 200 $m^2/g$ according to an analysis of nitrogen adsorption/desorption.

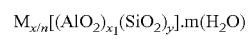  [Chemical Formula 1]

$$M_{x/n}[(AlO_2)_{x_1}(SiO_2)_y] \cdot m(H_2O)$$

In Chemical Formula 1, M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

In addition, according to the present disclosure, a rubber composition for tires including the reinforcing material for rubber and at least one diene elastomer is provided.

Hereinafter, the method for preparing aluminosilicate particles, the reinforcing material for rubber including the aluminosilicate particles, and the rubber composition for tires including the reinforcing material for rubber according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. The Method for Preparing Aluminosilicate Particles

One embodiment of the present disclosure provides a method for preparing aluminosilicate particles, including the steps of:

forming a raw material mixture comprising a basic or alkaline aqueous solution, a silicon source, and an aluminum source;

curing the raw material mixture to obtain aluminosilicate particles;

washing the aluminosilicate particles;

purifying the washed aluminosilicate particles to remove unreacted sources in the aluminosilicate particles; and drying the purified aluminosilicate particles.

During studies on aluminosilicate, it was confirmed that microscale unreacted sources remain inside the aluminosilicate particles or aggregates thereof, wherein the aluminosilicate particles are washed after curing the raw material mixture. In particular, it was confirmed that unreacted sources in the form of plates (for example, $SiO_2$ flakes, etc.) act as an impurity to the aluminosilicate particles to inhibit dispersibility of the particles.

In addition, as a result of further studies by the present inventors, when the unreacted sources in the aluminosilicate particles are removed by purifying the washed aluminosilicate particles after the curing of the raw material mixture, it was confirmed that aggregation between the prepared aluminosilicate particles is minimized and dispersibility in the rubber composition is improved as compared with the case in which the purification is not performed.

The aluminosilicate particles prepared by the above-described method can exhibit an enhanced reinforcing effect due to excellent dispersibility in the rubber composition, but do not hinder processability of the rubber composition. Therefore, they can be suitably applied as a reinforcing material for rubber used in a rubber composition for tires.

Hereinafter, each step included in the method for preparing aluminosilicate particles will be described in more detail.

In order to prepare aluminosilicate particles, the step of forming a raw material mixture including a basic or alkaline aqueous solution, a silicon source, and an aluminum source is carried out.

The raw material mixture is a liquid composition in which the silicon source and the aluminum source are uniformly mixed in the basic or alkaline aqueous solution. For example, the raw material mixture may be prepared by adding the silicon source and the aluminum source to the basic or alkaline aqueous solution and vigorously stirring.

Herein, the basic or alkaline aqueous solution is an aqueous solution containing a basic or alkaline compound applicable to synthesis of aluminosilicate. Examples of the basic or alkaline compound include sodium hydroxide, potassium hydroxide, tetramethylammonium hydroxide, and the like.

As the silicon source and the aluminum source, a compound known to be usable for the preparation of aluminosilicate can be applied without particular limitation.

Preferably, the silicon source may be at least one compound selected from the group consisting of fumed silica, rice husk, colloidal silica, cellite, pearlite, rice husk ash, silica fume, organosilane, clay, minerals, meta kaolin, calcined clay, active clay, fly ash, slag, pozzolan, glass powder, and red mud.

Further, the aluminum source may be at least one compound selected from the group consisting of alumina, aluminate, aluminum salt, organic aluminoxane, pearlite, clay, minerals, meta kaolin, calcined clay, active clay, fly ash, slag, pozzolan, glass powder, and red mud.

The ratio of the silicon source and the aluminum source included in the raw material mixture can be adjusted depending on the composition of the final aluminosilicate particles and the type of the sources.

Subsequently, the step of curing the raw material mixture to obtain aluminosilicate particles is carried out.

The curing may be performed by placing the raw material mixture in a suitable container and storing the container in a thermostatic oven in a sealed or opened state.

Specifically, the curing may be carried out by storing the raw material mixture at a temperature of 20 to 90° C. for 2 to 48 hours or 2 to 24 hours.

A solid product is formed from the raw material mixture by the curing, and aluminosilicate particles, which are solid products, may be obtained by dissociating the solid product.

Subsequently, the step of washing the aluminosilicate particles is carried out.

For the washing, water such as distilled water and deionized water may be used.

The washing may be carried out simultaneously or sequentially with dissociation of the solid product.

Specifically, the solid product formed from the raw material mixture by the curing is immersed in water such as distilled water and deionized water, heated, and stirred to dissociate. Then, the product is washed several times with water until it reaches a pH of 6 to 8, centrifuged, and washed with water to obtain the aluminosilicate particles.

In particular, in the method for preparing aluminosilicate particles according to the embodiment of the present disclosure, the step of purifying the washed aluminosilicate particles to remove unreacted sources in the aluminosilicate particles is carried out.

As described above, microscale unreacted sources remain inside the aluminosilicate particles or aggregates thereof, wherein the aluminosilicate particles are washed after curing the raw material mixture. Particularly, unreacted sources in the form of plates (for example, $SiO_2$ flakes, etc.) act as an impurity to the aluminosilicate particles to inhibit dispersibility of the particles.

Therefore, the aluminosilicate may have minimized aggregation and improved dispersibility in the rubber composition, by purifying the washed aluminosilicate particles to remove unreacted sources in the aluminosilicate particles.

The purifying may be carried out by dispersing the washed aluminosilicate particles in distilled water or deionized water to remove unreacted sources precipitated by a weight difference, and obtaining a supernatant liquid in which the aluminosilicate particles are dispersed.

The unreacted sources (particularly, $SiO_2$ flakes) have a particle size of a micrometer scale and are larger and heavier than aluminosilicate particles having a particle size of a nanometer scale. Accordingly, when the washed aluminosilicate particles are dispersed in distilled water, the aluminosilicate particles are dispersed in a colloidal state, and the unreacted sources are precipitated. The purification can be performed by obtaining a supernatant liquid in which the aluminosilicate particles are dispersed and removing the precipitated unreacted sources.

In performing the purification, the distilled water in which the washed aluminosilicate particles are dispersed may be centrifuged at 1000 to 2000 rpm to facilitate sedimentation of the unreacted sources.

Herein, the centrifugation in the step of washing and purification can be clearly distinguished in terms of purpose and effect.

Specifically, the centrifugation in the step of washing is performed to obtain a neutralized solute at a pH of 6 to 8 by repeating the process of completely separating the solute (such as aluminosilicate particles) from the washing solvent (water). On the other hand, the centrifugation in the step of purification can be additionally performed to obtain a supernatant liquid in which the aluminosilicate particles are dispersed in a colloidal state by facilitating sedimentation of the unreacted source.

Therefore, the unreacted sources in the aluminosilicate particles cannot be removed by centrifugation only in the step of washing.

Subsequently, the step of drying the surface-treated aluminosilicate particles at room temperature is carried out. The drying may be performed at a temperature of 20 to 150° C. for 1 to 48 hours.

The aluminosilicate particles can be obtained through the above-described steps, and conventional steps such as pulverizing the obtained aluminosilicate particles can be further performed, if needed.

The aluminosilicate particles prepared by the above-described method may have a composition of the following Chemical Formula 1.

$$M_{x/n}[(AlO_2)_{x_1}(SiO_2)_y]\cdot m(H_2O) \qquad \text{[Chemical Formula 1]}$$

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

II. The Reinforcing Material for Rubber

Another embodiment of the present disclosure provides a reinforcing material for rubber including amorphous aluminosilicate particles having a composition of the following Chemical Formula 1, wherein the aluminosilicate particles satisfy the following conditions:

in a data plot obtained by X-ray diffraction (XRD), a full width at half maximum (FWHM) in a 2θ range of 20° to 37° is 3° to 8.5°, a maximum peak intensity ($I_{max}$) is in a 2θ range of 26° to 31°, and the aluminosilicate particles exhibit a pattern having no peak of crystalline $SiO_2$ (JCPDS standard pattern number #46-1045), an average particle diameter is 10 to 100 nm, a Brunauer-Emmett-Teller surface area ($S_{BET}$) is 80 to 250 m²/g, and an external specific surface area ($S_{EXT}$) is 60 to 200 m²/g according to an analysis of nitrogen adsorption/desorption.

$$M_{x/n}[(AlO_2)_{x_1}(SiO_2)_y]\cdot m(H_2O) \qquad \text{[Chemical Formula 1]}$$

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

As a result of further studies by the present inventors, it was confirmed that the aluminosilicate particles satisfying the above-described characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In particular, as the aluminosilicate particles are prepared by the above-described method, there is no unreacted source inside the particles or aggregates thereof. Therefore, the aluminosilicate particles may exhibit excellent dispersibility and mechanical properties (for example, excellent durability, abrasion resistance, compressive strength, etc.) as compared with reinforcing materials not satisfying the above-described characteristics.

Conventional aluminosilicates do not easily disperse in the rubber composition even when a coupling agent for improving the dispersibility is used, because the aggregation of the particles occurs strongly during the dispersion in the rubber composition. However, the aluminosilicate particles satisfying the above-described characteristics can achieve excellent dispersibility similar to that of silica, while improving the reinforcing effect and reducing the rolling resistance.

According to the present disclosure, the aluminosilicate particles contained in the reinforcing material for rubber are amorphous.

In the amorphous aluminosilicate particles according to the embodiment of the present disclosure, the term 'amorphous' may mean that a full width at half maximum (FWHM) in a 2θ range of 20° to 37° in a data plot obtained by X-ray diffraction (XRD) is 3° to 8.5°.

Preferably, the FWHM is 3° or more, 3.5° or more, 4.0° or more, 4.5° or more, 5.0° or more, 5.5° or more, or 6.0° or more. In addition, preferably, the FWHM is 8.5° or less, 8.0° or less, 7.5° or less, or 7.0° or less.

The full width at half maximum (FWHM) is a numerical value of a peak width at half of the maximum peak intensity in the 2θ range of 20° to 37° obtained by X-ray diffraction of the aluminosilicate particles.

The unit of the full width at half maximum (FWHM) can be expressed in degrees (°) which is the unit of 2θ. Compounds having high crystallinity may have a small FWHM value.

In addition, the amorphous aluminosilicate particles according to the embodiment of the present disclosure are characterized in that a maximum peak intensity ($I_{max}$) is in a 2θ range of 26° to 31° in a data plot obtained by X-ray diffraction (XRD).

Preferably, the maximum peak intensity ($I_{max}$) is in a 2θ range of 26° or more, 27° or more, or 28° or more. In addition, preferably, the maximum peak intensity ($I_{max}$) is in a 2θ range of 31° or less, 30.5° or less, or 30° or less.

For reference, amorphous silica shows $I_{max}$ in a 2θ range of 20° to 25°, and amorphous alumina shows $I_{max}$ in a 2θ range of 30° to 40°.

Particularly, the aluminosilicate particles exhibit a pattern having no peak of crystalline $SiO_2$ (JCPDS standard pattern number #46-1045) in a data plot obtained by X-ray diffraction (XRD), since they do not have the unreacted sources (for example, SiO$_2$ flakes, etc.) inside the particles or aggregates thereof.

In addition, the aluminosilicate particles have a composition of the following Chemical Formula 1.

   [Chemical Formula 1]

In Chemical Formula 1,

M is an element selected from the group consisting of Li, Na, K, Rb, Cs, Be, and Fr, or an ion thereof;

x>0, y>0, n>0, and m≥0;

1.0≤y/x≤5.0; and 0.5≤x/n≤1.2.

That is, the aluminosilicate particles contain a metal element (M) or an ion thereof, an alkali metal or an ion thereof, and in particular satisfy a composition of 1.0≤y/x≤5.0 and 0.5≤x/n≤1.2.

Specifically, in Chemical Formula 1, y/x is 1.0 or more, 1.15 or more, 1.3 or more, or 1.45 or more, and 5.0 or less, 4.5 or less, 4.0 or less, 3.5 or less, 3.0 or less, 2.5 or less, or 2.0 or less, which may be advantageous for manifesting all of the properties according to the present disclosure.

Specifically, in Chemical Formula 1, x/n is 0.5 or more, 0.55 or more, 0.6 or more, 0.65 or more, 0.7 or more, 0.75 or more, or 0.8 or more, and 1.2 or less, or 1.15 or less, which may be advantageous for manifesting all of the properties according to the present disclosure.

An average primary particle diameter of the whole aluminosilicate particles is 10 to 100 nm, which may be advantageous for manifesting all the properties according to the present disclosure.

Specifically, the average primary particle diameter of all aluminosilicate particles is 10 nm or more, 15 nm or more, or 20 nm or more; and 100 nm or less, 80 nm or less, 60 nm or less, or 50 nm or less.

In general, the smaller the particle diameter of the reinforcing material for rubber, the better the reinforcing effect. However, the smaller the particle diameter, the more easily the aggregation phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

The aluminosilicate particles may be in the form of primary particles that are substantially non-aggregated in the rubber composition, while being amorphous particles having the above-described composition.

According to the embodiment of the present disclosure, the aluminosilicate particles are characterized in that a Brunauer-Emmett-Teller surface area ($S_{BET}$) is 80 to 250 m$^2$/g, and an external specific surface area ($S_{EXT}$) is 60 to 200 m$^2$/g according to an analysis of nitrogen adsorption/desorption, which may be advantageous for manifesting all the properties according to the present disclosure.

Specifically, the $S_{BET}$ is 80 m$^2$/g or more, 85 m$^2$/g or more, 90 m$^2$/g or more, 95 m$^2$/g or more, or 100 m$^2$/g or more; and 250 m$^2$/g or less, 190 m$^2$/g or less, 180 m$^2$/g or less, 170 m$^2$/g or less, 160 m$^2$/g or less, 150 m$^2$/g or less, or 130 m$^2$/g or less.

Specifically, the $S_{EXT}$ is 60 m$^2$/g or more, 70 m$^2$/g or more, 80 m$^2$/g or more, or 90 m$^2$/g or more; and 200 m$^2$/g or less, 180 m$^2$/g or less, 160 m$^2$/g or less, 140 m$^2$/g or less, or 120 m$^2$/g or less.

Further, the ratio of $S_{BET}$ to $S_{EXT}$ ($S_{EXT}/S_{BET}$) of the aluminosilicate particles is 0.8 to 1.0, which may be advantageous for manifesting all the properties according to the present disclosure. Specifically, the $S_{EXT}/S_{BET}$ is 0.80 or more, 0.81 or more, 0.82 or more, 0.83 or more, or 0.84 or more; and 1.0 or less, 0.99 or less, 0.95 or less, or 0.90 or less.

On the other hand, it is preferable that the content of micropores in the inorganic material used as the reinforcing material for rubber is minimized. This is because the micropores act as defects and can deteriorate the physical properties of the reinforcing material for rubber.

According to an embodiment of the present disclosure, the aluminosilicate particles are characterized in that a volume of micropores ($V_{micro}$) having a pore size of less than 2 nm calculated from the $S_{BET}$ by a t-plot method is less than 0.05 cm$^3$/g, which can exhibit excellent mechanical properties as a reinforcing material for rubber. Specifically, the $V_{micro}$ is 0.05 cm$^3$/g or less, 0.025 cm$^3$/g or less, 0.02 cm$^3$/g or less, 0.015 cm$^3$/g or less, 0.01 cm$^3$/g or less, or 0.007 cm$^3$/g or less.

In addition, the aluminosilicate particles may have a particle size distribution which shows a volume average particle diameter ($D_{mean}$) of 1 to 25 μm, a geometric standard deviation of 1 to 20 μm, and a 90% particle diameter ($D_{90}$) of 1 to cumulative 100 μm, when measured under distilled water.

Specifically, the aluminosilicate particles may have a volume average particle diameter ($D_{mean}$) of 1 μm or more, 2.5 μm or more, 5 μm or more, 7.5 μm or more, 10 μm or more, or 15 μm or more, and 25 μm or less, or 22.5 μm or less, when measured under distilled water.

The aluminosilicate particles may have a geometric standard deviation of 1 μm or more, 2.5 μm or more, 5 μm or more, or 10 μm or more, and 20 μm or less, or 17.5 μm or less, when measured under distilled water.

The aluminosilicate particles may have a 90% cumulative particle diameter ($D_{90}$) of 1 μm or more, 5 μm or more, 10 μm or more, 20 μm or more, or 25 μm or more, and 100 μm or less, 75 μm or less, or 50 μm or less, when measured under distilled water.

As described above, the reinforcing material for rubber according to the present disclosure includes amorphous aluminosilicate particles having an average primary particle diameter of 100 nm or less.

Particularly, the aluminosilicate particles can exhibit excellent dispersibility in the rubber composition while satisfying the above-described specific surface area characteristics.

In addition, the aluminosilicate particles may exhibit excellent dispersibility and mechanical properties as compared with reinforcing materials not satisfying the above-described characteristics, since there is no unreacted source inside the particles or aggregates thereof and the formation of micropores in the particles is reduced.

Furthermore, the aluminosilicate particles do not inhibit the progress of the vulcanization process and the curing process of the rubber composition, thereby making it possible to achieve processability of the rubber composition and productivity of the tire manufacturing process using the same.

The aluminosilicate particles satisfying all of the above characteristics may be prepared by the above-described method for preparing aluminosilicate particles.

III. The Rubber Composition for Tires

According to another embodiment of the present disclosure, a rubber composition for tires including the reinforcing material for rubber is provided.

The reinforcing material for rubber includes the above-described aluminosilicate particles.

The aluminosilicate particles satisfying the above-mentioned characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

The rubber composition for tires may include a general diene elastomer without any particular limitation.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

Further, the rubber composition for tires may include a coupling agent which provides chemical and/or physical bonding between the reinforcing material for rubber and the diene elastomer. As the coupling agent, conventional components such as a polysiloxane-based compound may be included without particular limitation.

In addition, plasticizers, pigments, antioxidants, ozone deterioration inhibitors, vulcanization accelerators, and the like which are commonly used in the tire industry may be added to the rubber composition for tires.

Advantageous Effects

The reinforcing material for rubber including the aluminosilicate particles prepared by the method of the present disclosure can exhibit excellent dispersibility in the rubber composition and an enhanced reinforcing effect, so that it can be suitably used in eco-friendly tires requiring high efficiency and high fuel efficiency.

DETAILED DESCRIPTION OF THE EMBODIMENTS

Figure 1A:
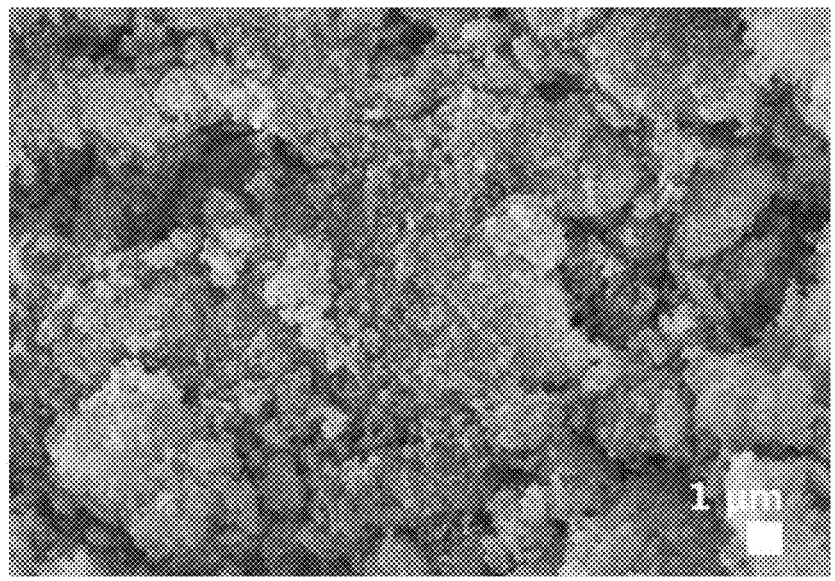
FIG. 1 shows scanning electron microscopy (SEM) images of the aluminosilicate particles according to Example 1 [(a) 5000 times magnification; (b) 100,000 times magnification].

Hereinafter, preferred examples are provided for better understanding. However, these examples are for illustrative purposes only, and the invention is not intended to be limited by these examples.

Example 1

23 g of KOH (Daejung Chemicals & Metals) and 27 g of colloidal silica (Ludox HS 30 wt %, Sigma-Aldrich) were completely dissolved in 62 ml of distilled water (DW). 15 g of metakaolin ($Al_2Si_2O_7$, Sigma-Aldrich) was added to the solution, followed by mixing at 800 rpm for 40 minutes using an overhead stirrer.

This was cured at a temperature of about 70° C. for 4 hours.

The solid product obtained by curing was poured into distilled water, stirred for 12 hours, and centrifuged to wash it to about pH 7.

The washed solid product was dispersed in distilled water to form a colloidal solution, followed by centrifugation at 1500 rpm for 5 minutes to precipitate the unreacted sources. From this, a supernatant liquid in which the aluminosilicate particles were dispersed was obtained and the precipitated unreacted sources were discarded.

It was confirmed by analysis that the precipitated unreacted sources contain $SiO_2$ flakes which are a kind of unreacted sources which were present in the solid product.

The supernatant liquid in which the aluminosilicate particles were dispersed was dried in an oven at 70° C. for 24 hours to obtain final aluminosilicate particles.

Example 2

Aluminosilicate particles were obtained in the same manner as in Example 1, except that metakaolin ($Al_2Si_2O_7$, BASF, SP33) was used instead of the metakaolin ($Al_2Si_2O_7$, Sigma-Aldrich).

Specifically, 23 g of KOH (Daejung Chemicals & Metals) and 27 g of colloidal silica (Ludox HS 30 wt %, Sigma-Aldrich) were completely dissolved in 62 ml of distilled water (DW). 15 g of metakaolin ($Al_2Si_2O_7$, BASF, SP33) was added to the solution, followed by mixing at 800 rpm for 40 minutes using an overhead stirrer.

This was cured at room temperature of about 70° C. for 4 hours.

The solid product obtained by curing was poured into distilled water, stirred for 12 hours, and centrifuged to wash it to about pH 7.

The washed solid product was dispersed in distilled water to form a colloidal solution, followed by centrifugation at 1500 rpm for 5 minutes to precipitate the unreacted sources. From this, a supernatant liquid in which the aluminosilicate particles were dispersed was obtained and the precipitated unreacted sources were discarded.

It was confirmed by analysis that the precipitated unreacted sources contain $SiO_2$ flakes which are a kind of unreacted sources which were present in the solid product.

The supernatant liquid in which the aluminosilicate particles were dispersed was dried in an oven at 70° C. for 24 hours to obtain final aluminosilicate particles.

Comparative Example 1

Aluminosilicate particles were obtained in the same manner as in Example 1, except that the step of purification for the washed solid product was not performed.

Specifically, 23 g of KOH (Daejung Chemicals & Metals) and 27 g of colloidal silica (Ludox HS 30 wt %, Sigma-Aldrich) were completely dissolved in 62 ml of distilled water (DW). 15 g of metakaolin ($Al_2Si_2O_7$, Sigma-Aldrich) was added to the solution, followed by mixing at 800 rpm for 40 minutes using an overhead stirrer.

This was cured at room temperature of about 70° C. for 4 hours.

The solid product obtained by curing was poured into distilled water, stirred for 12 hours, and centrifuged to wash it to about pH 7.

The washed solid product was dried in an oven at 70° C. for 24 hours to obtain final aluminosilicate particles.

Comparative Example 2

Aluminosilicate particles were obtained in the same manner as in Example 2, except that the step of purification for the washed solid product was not performed.

Specifically, 23 g of KOH (Daejung Chemicals & Metals) and 27 g of colloidal silica (Ludox HS 30 wt %, Sigma-Aldrich) were completely dissolved in 62 ml of distilled water (DW). 15 g of metakaolin ($Al_2Si_2O_7$, BASF, SP33) was added to the solution, followed by mixing at 800 rpm for 40 minutes using an overhead stirrer. This was cured at room temperature of about 70° C. for 4 hours.

The solid product obtained by curing was poured into distilled water, stirred for 12 hours, and centrifuged to wash it to about pH 7.

The washed solid product was dried in an oven at 70° C. for 24 hours to obtain final aluminosilicate particles.

Preparation Example 1

728.01 g of a diene elastomer mixture (SSBR 2550, LG Chem), 370.62 g of aluminosilicate particles according to Example 1 as a reinforcing material, 59.30 g of a silane coupling agent (X50-S, Evonik Industries), and 52.94 g of additives (antioxidant, dispersion accelerator, vulcanization assistant, etc.) were added to a Banbury mixer, and a CMB (carbon master batch) was produced at 150° C. The resulting mixture was extruded in the form of a sheet having a thickness of 2 to 3 mm.

The CMB sheet was aged at room temperature for 24 hours, and then added into a Banbury mixer together with 24.75 g of a vulcanizing agent and a vulcanization accelerator to produce an FMB (final master batch). The resulting mixture was extruded in the form of a sheet having a thickness of 2 to 3 mm.

This was crosslinked at 160° C. to obtain a rubber molded product. At this time, the crosslinking time was controlled with reference to data obtained by measuring the above mixture at 160° C. using a moving die rheometer (MDR).

Preparation Example 2

728.01 g of a diene elastomer mixture (SSBR 2550, LG Chem), 370.62 g of aluminosilicate particles according to Example 2 as a reinforcing material, 59.30 g of a silane coupling agent (X50-S, Evonik Industries), and 52.94 g of additives (antioxidant, dispersion accelerator, vulcanization assistant, etc.) were added to a Banbury mixer and a CMB (carbon master batch) was produced at 150° C. The resulting mixture was extruded in the form of a sheet having a thickness of 2 to 3 mm.

The CMB sheet was aged at room temperature for 24 hours, and then added into a Banbury mixer together with 24.75 g of a vulcanizing agent and a vulcanization accelerator to produce an FMB (final master batch). The resulting mixture was extruded in the form of a sheet having a thickness of 2 to 3 mm.

This was crosslinked at 160° C. to obtain a rubber molded product. At this time, the crosslinking time was controlled with reference to data obtained by measuring the above mixture at 160° C. using a moving die rheometer (MDR).

Comparative Preparation Example 1

730.96 g of a diene elastomer mixture (SSBR 2550, LG Chem), 372.12 g of aluminosilicate particles according to Comparative Example 1 as a reinforcing material, 59.54 g of a silane coupling agent (X50-S, Evonik Industries) and 53.16 g of additives (antioxidant, dispersion accelerator, vulcanization assistant, etc.) were added to a Banbury mixer and a CMB (carbon master batch) was produced at 150° C. The resulting mixture was extruded in the form of a sheet having a thickness of 2 to 3 mm.

The CMB sheet was aged at room temperature for 24 hours, and then added into a Banbury mixer together with 24.84 g of a vulcanizing agent and a vulcanization accelerator to produce an FMB (final master batch). The resulting mixture was extruded in the form of a sheet having a thickness of 2 to 3 mm.

Comparative Preparation Example 2

730.96 g of a diene elastomer mixture (SSBR 2550, LG Chem), 372.12 g of aluminosilicate particles according to Comparative Example 2 as a reinforcing material, 59.54 g of a silane coupling agent (X50-S, Evonik Industries) and 53.16 g of additives (antioxidant, dispersion accelerator, vulcanization assistant, etc.) were added to a Banbury mixer and a CMB (carbon master batch) was produced at 150° C. The resulting mixture was extruded in the form of a sheet having a thickness of 2 to 3 mm.

The CMB sheet was aged at room temperature for 24 hours, and then added into a Banbury mixer together with 24.84 g of a vulcanizing agent and a vulcanization accelerator to produce an FMB (final master batch). The resulting mixture was extruded in the form of a sheet having a thickness of 2 to 3 mm.

Experimental Example 1

Scanning electron microscopy (SEM) images of the aluminosilicate particles according to the examples and comparative examples were taken.

Figure 1B:
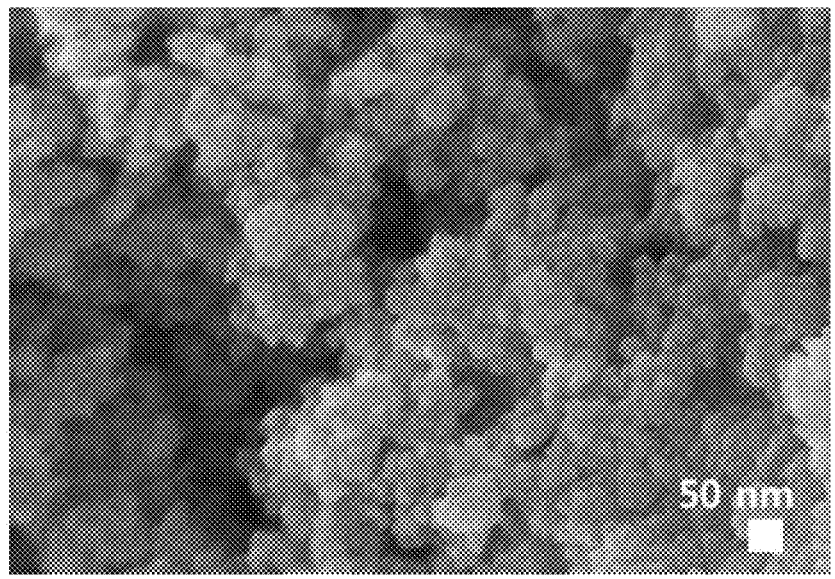
Figure 2A:
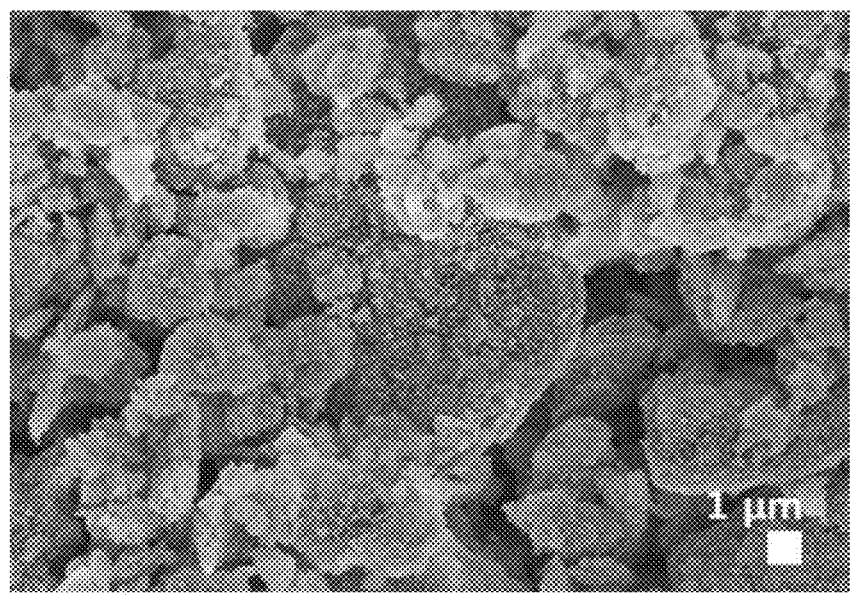
FIG. 2 shows SEM images of the aluminosilicate particles according to Comparative Example 1 [(a) 5,000 times magnification; (b) 100,000 times magnification].
Figure 2B:
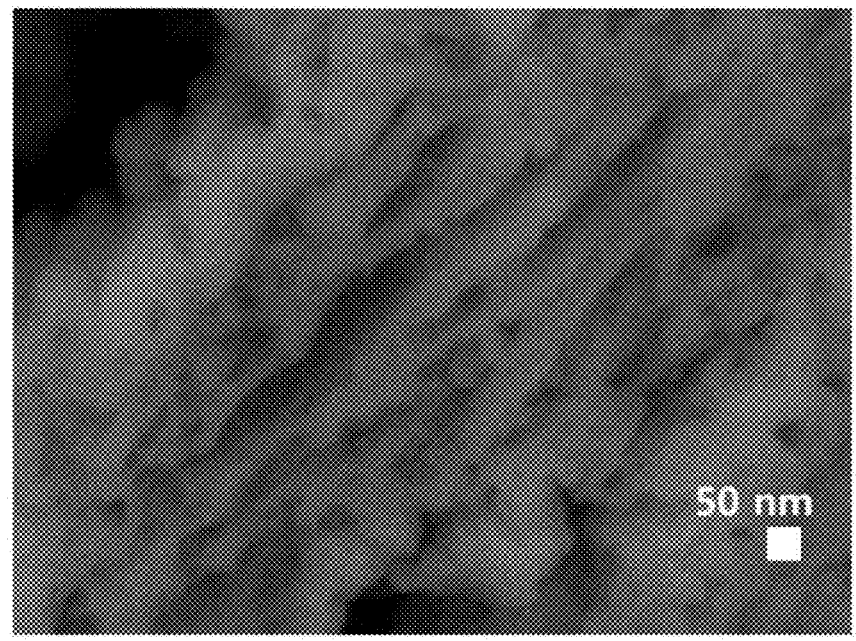

FIG. 1 shows images of the particles according to Example 1 [(a) 5000 times magnification; (b) 100,000 times magnification], and FIG. 2 shows images of the particles according to Comparative Example 1 [(a) 5000 times magnification; (b) 100,000 times magnification].

Referring to FIG. 1, it was confirmed that the particles of Example 1 were composed of primary particles of 30 to 40 nm and did not form aggregates.

Referring to FIG. 2, it was confirmed that the particles of Comparative Example 1 formed aggregates in a micrometer scale. Further, it was confirmed that some of the primary particles on the surface of the aggregates have a size of 30 to 40 nm which is similar to that of Example 1, but the inside of the aggregates was composed of a plate-like structure in a hundred nanometer scale.

Experimental Example 2

The nitrogen adsorption/desorption Brunauer-Emmett-Teller surface area ($S_{BET}$) and the external specific surface area ($S_{EXT}$) were measured for each of the particles according to the examples and comparative examples using a specific surface area analyzer (BEL Japan Inc., BELSORP_MAX). Then, the volume of micropores ($V_{micro}$) having a pore size of less than 2 nm was calculated from the $S_{BET}$ by a t-plot method.

TABLE 1

|  | Primary particle size (nm) | $S_{BET}$ (m²/g) | $S_{EXT}$ (m²/g) | $S_{EXT}/S_{BET}$ | $V_{micro}$ (cm³/g) |
|---|---|---|---|---|---|
| Example 1 | 30 | 104.37 | 89.33 | 0.88 | 0.006 |
| Example 2 | 30 | 94.89 | 84.25 | 0.89 | 0.005 |
| Comp. Ex. 1 | 30 | 101.19 | 87.96 | 0.84 | 0.005 |
| Comp. Ex. 2 | 30 | 84.45 | 75.55 | 0.89 | 0.004 |

Experimental Example 3

0.1 g of the particles according to the examples and comparative examples were added to 10 ml of distilled water. Then, it was sonicated for 5 minutes at 90% power in a 100 W pulsed ultrasonication apparatus. Here, the energy by the sonication acts as physical energy similar to mechanical force applied to the composition when the rubber composition is blended, so that the size distribution of the aggregates dispersed in the rubber composition can be indirectly compared.

The resulting dispersion was sonicated for another 2 minutes, and then a size distribution, a volume average particle diameter ($D_{mean}$), a geometric standard deviation (Std. Dev.), and a cumulative particle diameter of the volume distribution ($D_{10}$, $D_{50}$, $D_{90}$) of the aggregates were measured using a particle size analyzer (manufactured by HORIBA, model name LA960, laser diffraction type).

The particles are dispersed in a nanoscale size with little aggregation when dispersed in the rubber composition. However, when the particles are measured using the particle size analyzer, they tend to aggregate more due to the use of water as a solvent. For this reason, the following measurement results are in a microscale size. That is, the particle size analyzer measurement can be understood to be performed not to directly determine the size distribution of the particles dispersed in the rubber composition but to relatively compare the size distribution of the particles.

Figure 3A:
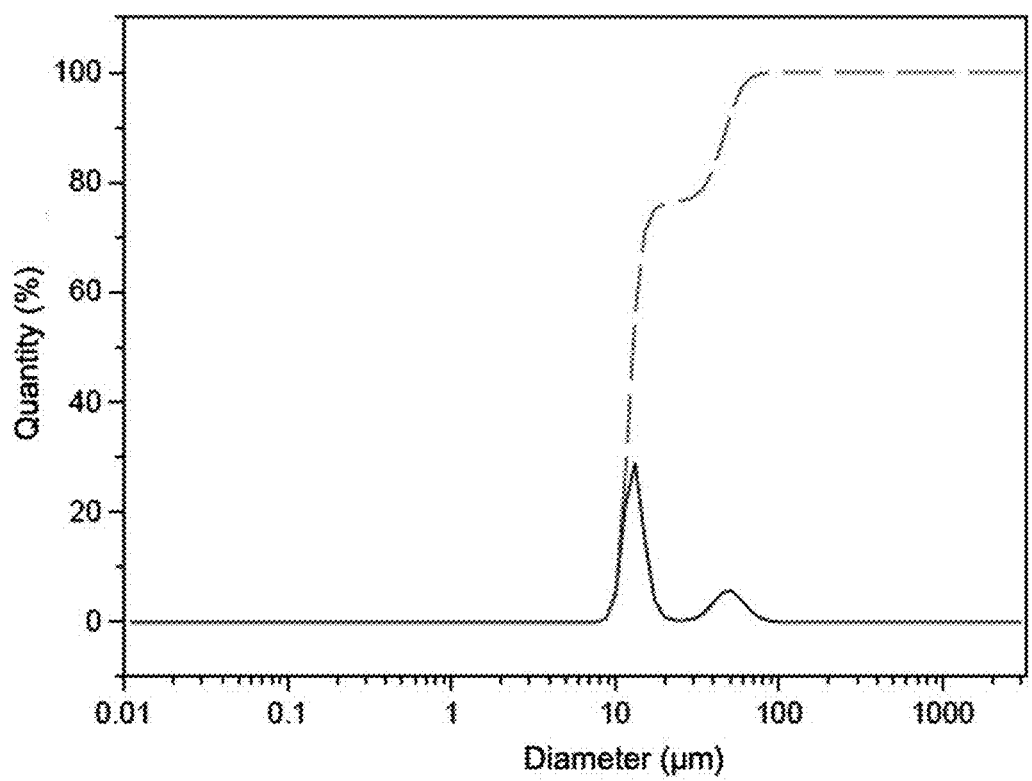
FIG. 3 shows graphs of particle size distribution for the aluminosilicate particles of Example 1 and Comparative Example 1 [(a) Example 1; (b) Comparative Example 1].
Figure 3B:
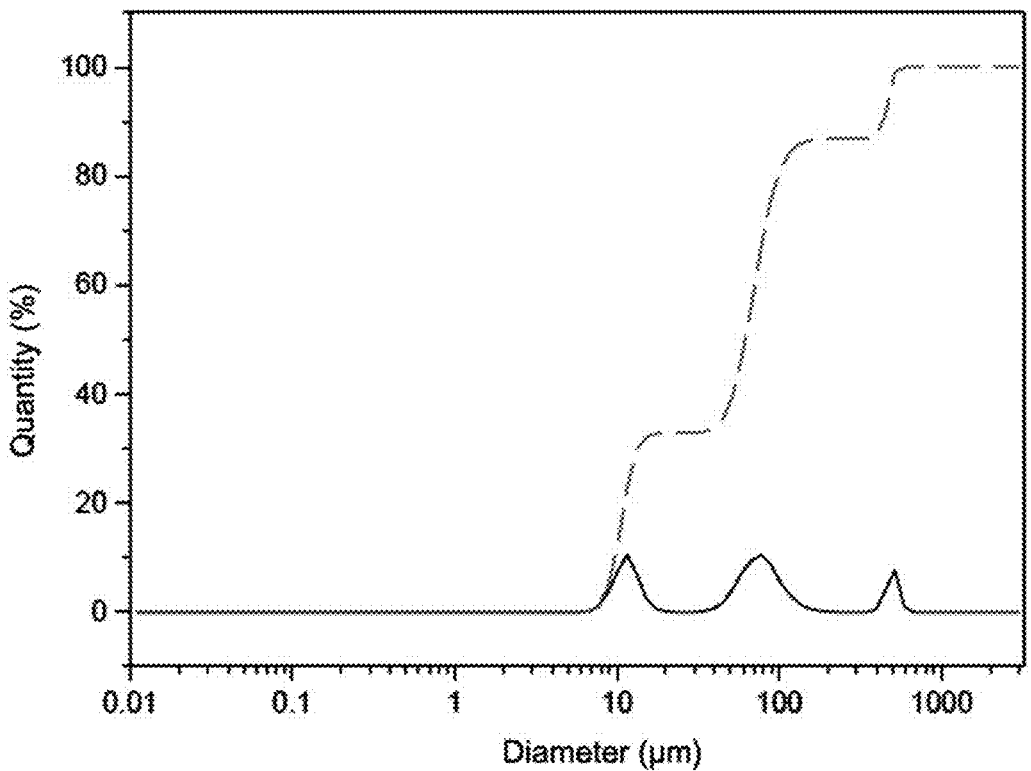

FIG. 3 shows graphs of a particle size distribution for the aluminosilicate particles of Example 1 and Comparative Example 1 [(a) Example 1; (b) Comparative Example 1].

TABLE 2

|  | Example 1 | Comparative Example 1 |
|---|---|---|
| $D_{mean}$ (μm) | 21.7178 | 104.5625 |
| Std. Dev. (μm) | 15.7814 | 144.6984 |
| $D_{10}$ (μm) | 10.5253 | 9.6960 |
| $D_{50}$ (μm) | 13.2095 | 61.7261 |
| $D_{90}$ (μm) | 48.3251 | 431.1577 |

Referring to Table 2 and FIG. 3, the particles of Example 1 hardly formed aggregates, and had a uniform particle size distribution. On the other hand, the particles of Comparative Example 1 mostly formed aggregates, which showed a significant difference in $D_{mean}$, Std. Dev., $D_{50}$, and $D_{90}$ as compared with the particles of Example 1.

Experimental Example 4

X-ray diffraction analysis for each aluminosilicate particle according to the examples and comparative examples was carried out using an X-ray diffractometer (Bruker AXS D4-Endeavor XRD) under an applied voltage of 40 kV and an applied current of 40 mA.

Figure 4A:
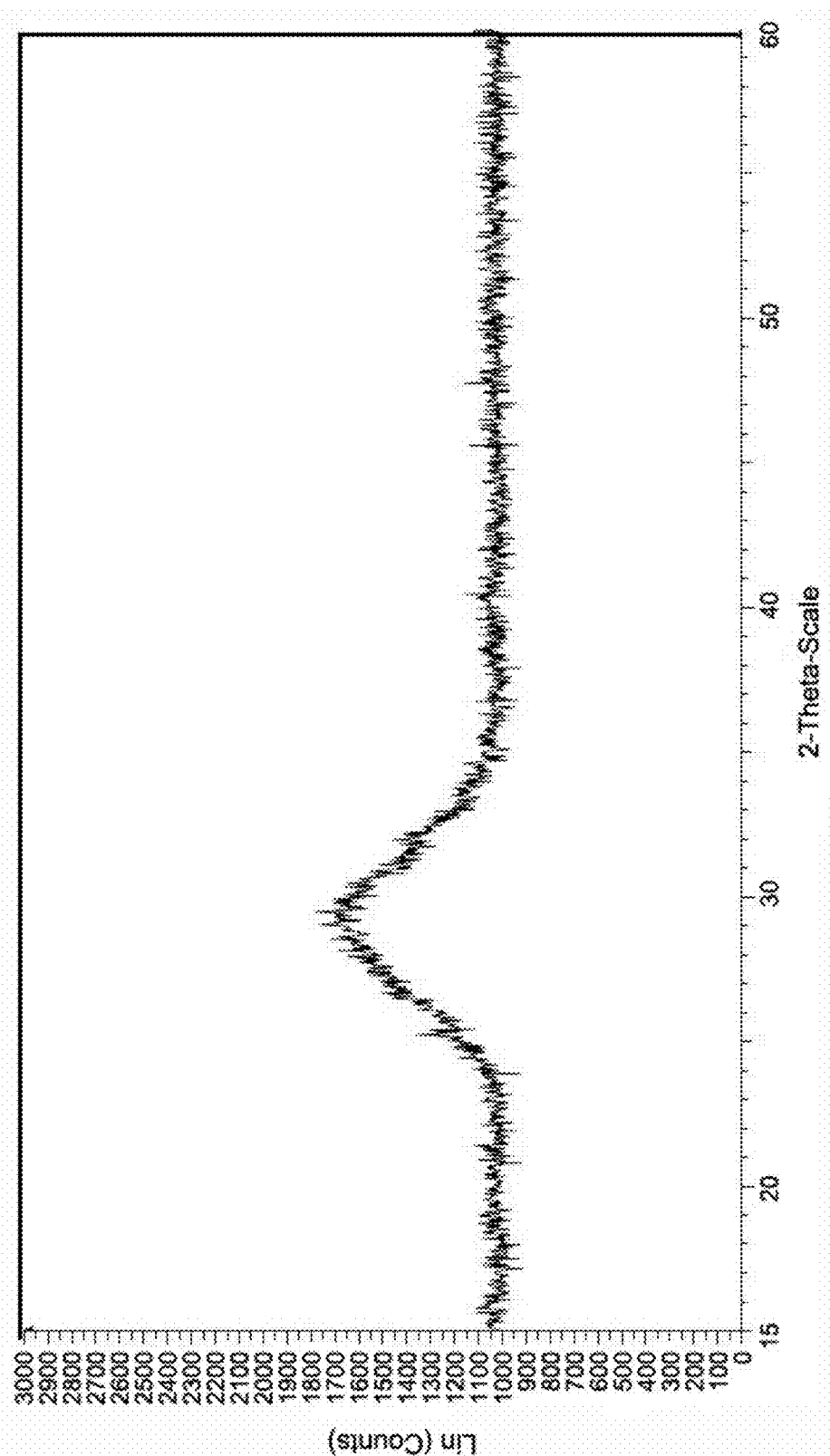
FIG. 4 shows X-ray diffraction analysis patterns for the aluminosilicate particles according to Examples 1 and 2 [(a) Example 1; (b) Example 2].
Figure 4B:
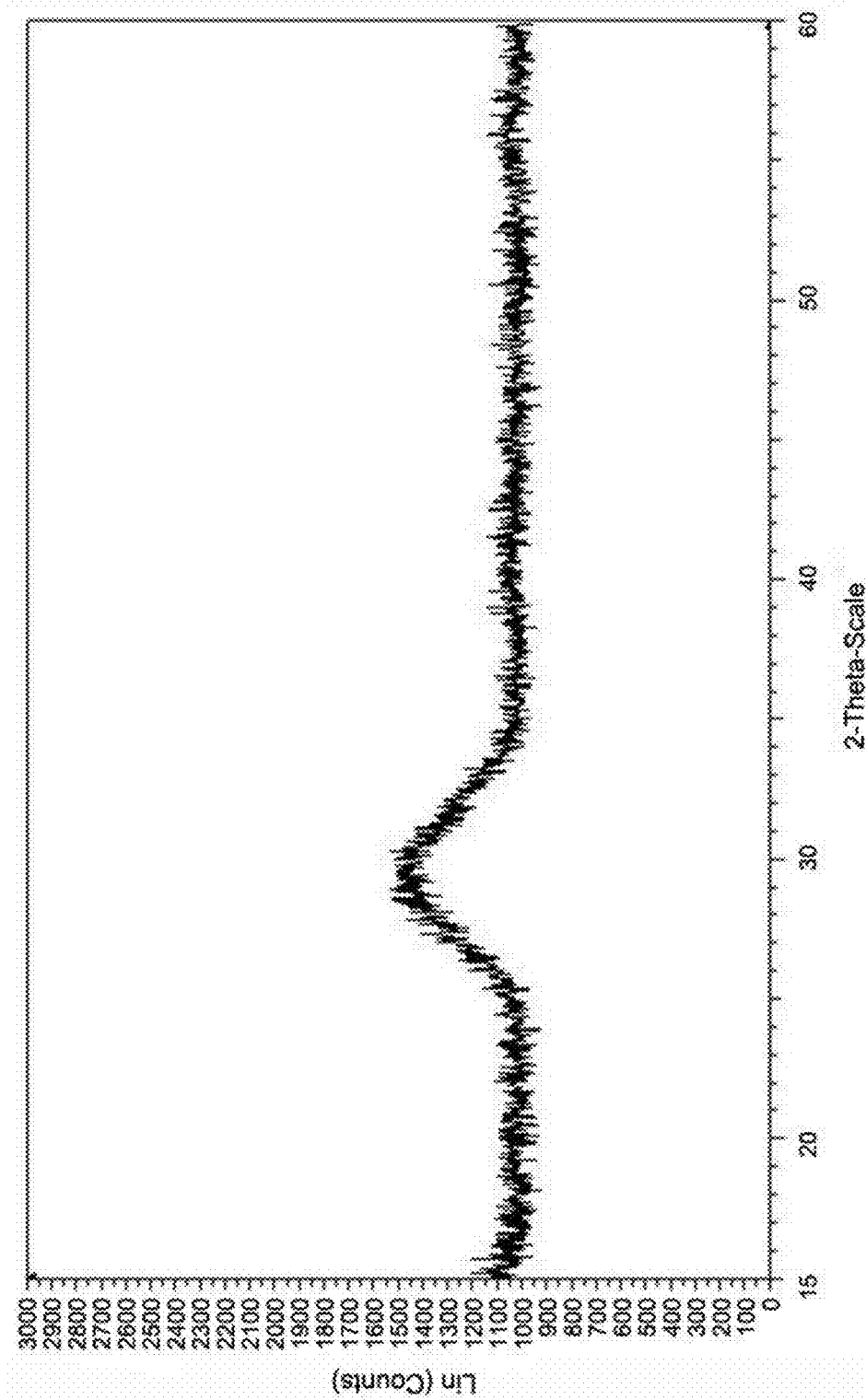

FIG. 4 shows X-ray diffraction analysis patterns for the aluminosilicate particles according to Examples 1 and 2 [(a) Example 1; (b) Example 2].

Figure 5A:
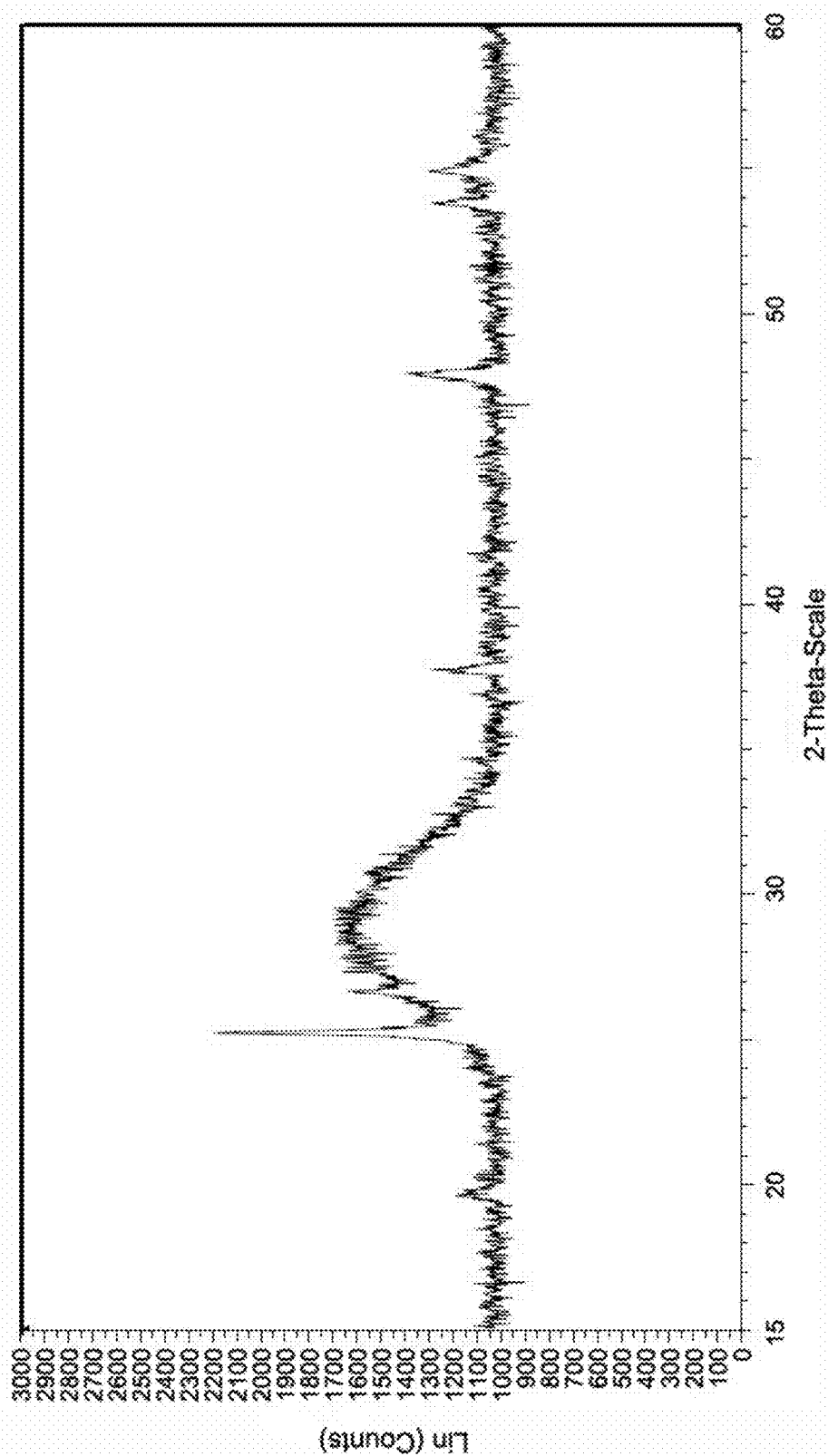
FIG. 5 shows X-ray diffraction analysis patterns for the aluminosilicate particles according to Comparative Examples 1 and 2 [(a) Comparative Example 1; (b) Comparative Example 2].
Figure 5B:
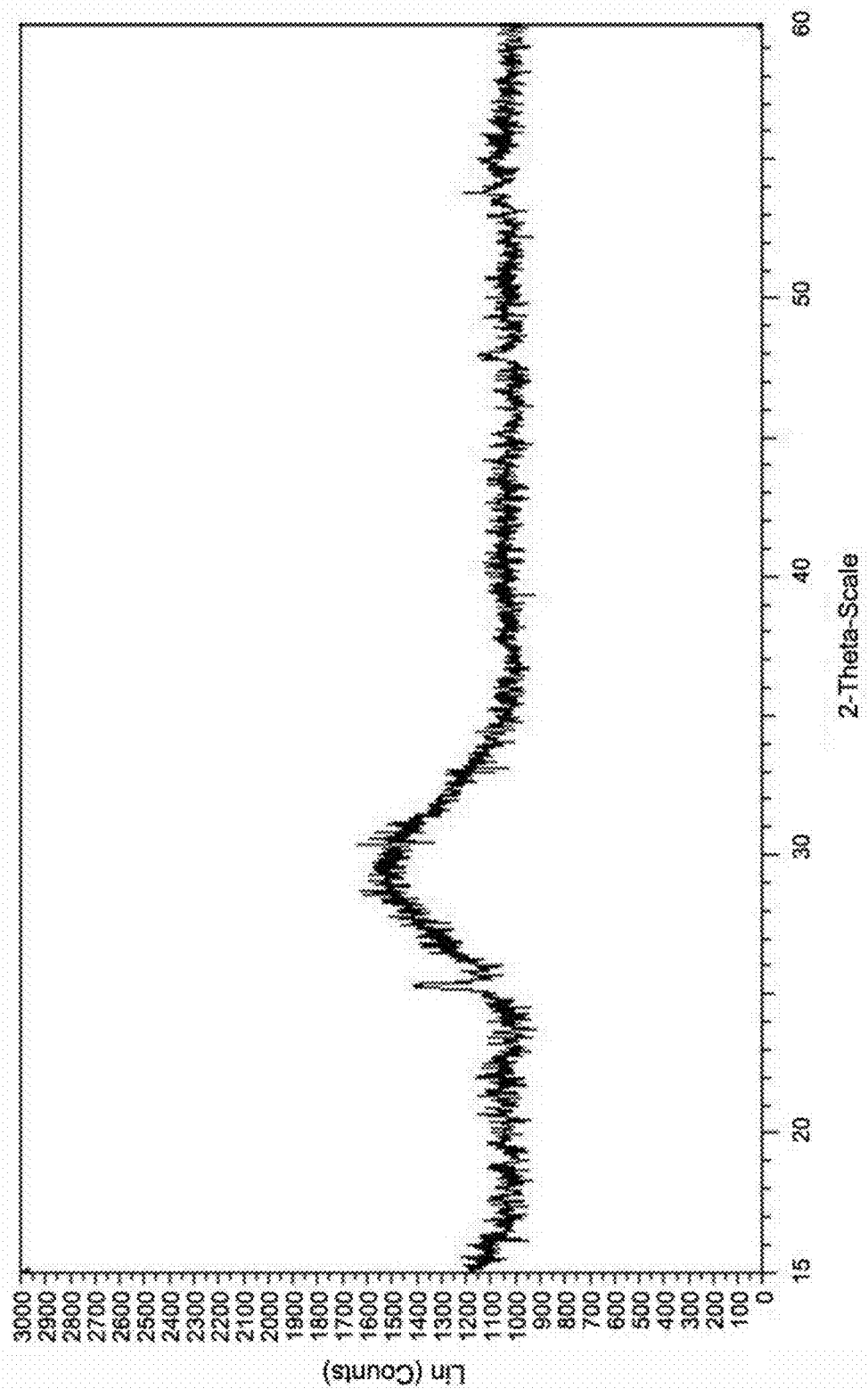

FIG. 5 shows X-ray diffraction analysis patterns for the aluminosilicate particles according to Comparative Examples 1 and 2 [(a) Comparative Example 1; (b) Comparative Example 2].

The measured range of 2θ was 10° to 90°, and it was scanned at an interval of 0.05°. Herein, a variable divergence slit of 6 mm was used as a slit, and a large PMMA holder (diameter=20 mm) was used to eliminate background noise due to the PMMA holder.

Further, a full width at half maximum (FWHM) at a peak of about 29° which is the maximum peak in the 2θ range of 20° to 37° was calculated in the data plot obtained by X-ray diffraction (XRD).

As a result, it was confirmed that the aluminosilicate particles of Examples 1 to 2 and Comparative Examples 1 and 2 have an amorphous structure (FWHM=6.745°, 2θ@$I_{max}$=29.2° in the 2θ range of 20° to 37° of XRD).

However, referring to FIGS. 4 and 5, the aluminosilicate particles of Examples 1 and 2 exhibited a pattern having no peak of crystalline $SiO_2$ (JCPDS standard pattern number #46-1045), whereas Comparative Examples 1 and 2 exhibited a pattern having the peak of crystalline $SiO_2$.

That is, both of the aluminosilicate particles of the examples and comparative examples are amorphous, but the particles of Comparative Examples 1 and 2 were confirmed to exhibit the above-mentioned pattern due to the presence of crystalline $SiO_2$ as an unreacted source inside thereof, while the particles of Examples 1 and 2 were confirmed to have no crystalline $SiO_2$.

Experimental Example 5

Component analysis for the aluminosilicate particles of Example 1 and Comparative Example 1 was carried out by X-ray fluorescence (XRF) analysis (HORIBA).

TABLE 3

| (mass %) | Example 1 | Comparative Example 1 |
|---|---|---|
| $SiO_2$ | 48.12 | 46.60 |
| $Al_2O_3$ | 25.65 | 25.82 |
| $K_2O$ | 25.08 | 23.45 |
| $TiO_2$ | 0.13 | 2.30 |
| $Fe_2O_3$ | 0.48 | 0.71 |
| CaO | 0.18 | 0.37 |
| $Na_2O$ | 0.21 | 0.29 |
| MgO | 0.03 | 0.12 |
| etc. | 0.12 | 0.34 |

Each aluminosilicate particles of Example 1 and Comparative Example 1 contained Si, K, Al, and O as major components.

It was confirmed that the particles of Example 1 had an impurity content of 1.15 mass % excluding $SiO_2$, $Al_2O_3$, and $K_2O$. On the other hand, the particles of Comparative Example 1 had an impurity content of 4.13 mass %, which is 4 times that of Example 1.

Experimental Example 6

Figure 6A:
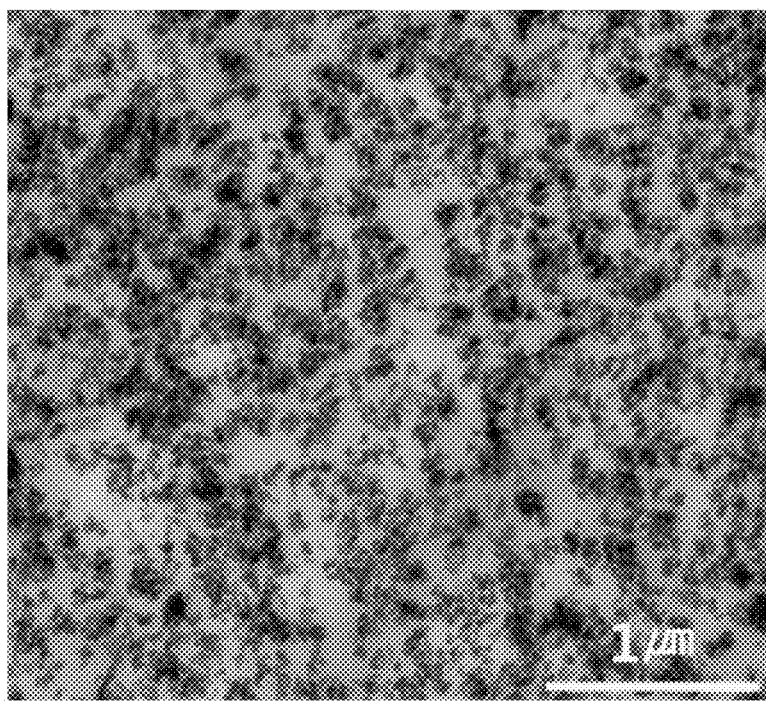
FIG. 6 shows transmission electron microscopy (TEM) images of the rubber molded product according to Preparation Example 1 [(a) scale bar 1 μm; (b) scale bar 500 nm].
Figure 6B:
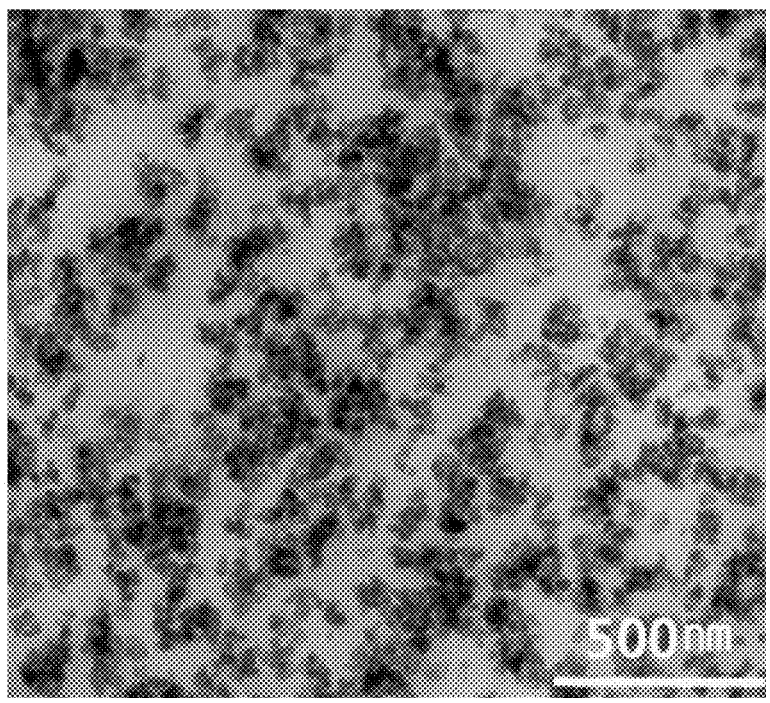

The dispersion state of the rubber molded products according to preparation examples and comparative preparation examples was observed using a transmission electron microscope (TEM). The photographed TEM images are shown in FIG. 6 [Preparation Example 1—(a) scale bar 1 µm; (b) scale bar 500 nm] and FIG. 7 [Comparative Preparation Example 1—(a) scale bar 1 µm; (b) scale bar 500 nm].

Figure 7A:
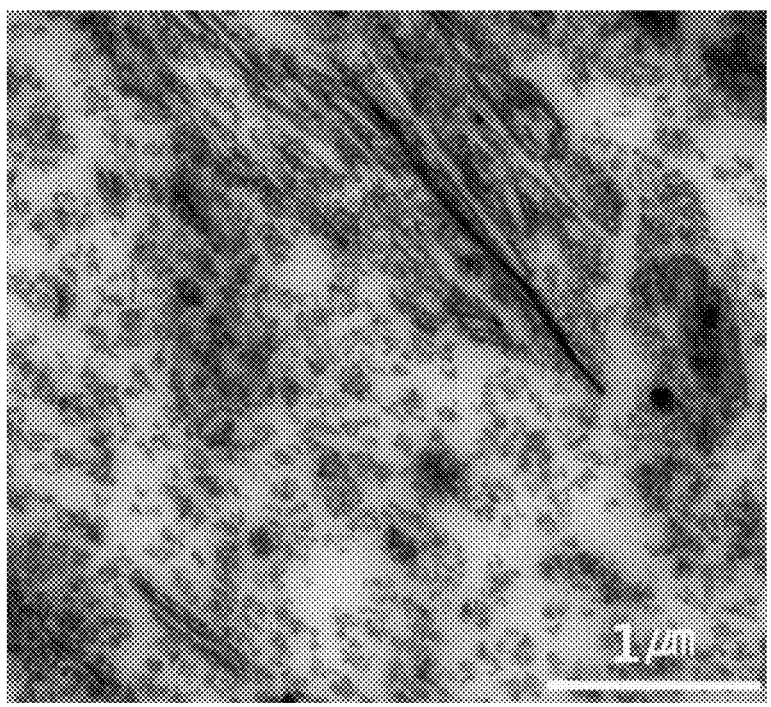
FIG. 7 shows TEM images of the rubber molded product according to Comparative Preparation Example 1 [(a) scale bar 1 μm; (b) scale bar 500 nm].
Figure 7B:
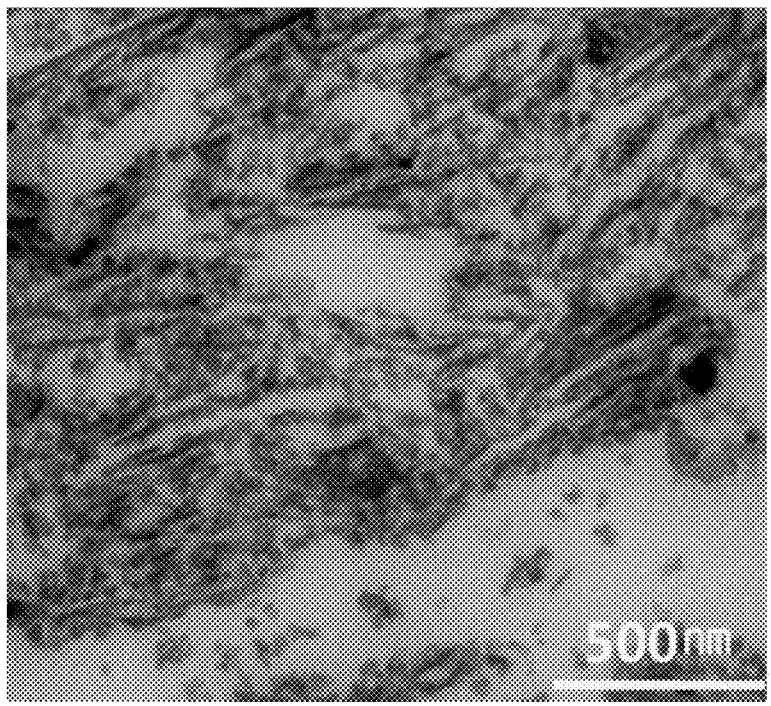

Referring to FIGS. 6 and 7, it can be confirmed that Preparation Example 1 to which the aluminosilicate particles of Example 1 were applied exhibited a remarkably superior dispersion state of the reinforcing material than Comparative Preparation Example 1.

Experimental Example 7

(1) The dynamic loss factor (tan δ) of the rubber molded products of Preparation Examples 1 to 2 and Comparative Preparation Examples 1 to 2 was measured under a dynamic strain of 3% and a static strain of 3% using a viscoelasticity measurement apparatus (DMTS 500N, Gabo, Germany).

For reference, the dynamic loss factor (tan δ@0° C.) at 0° C. is related to wet grip property of tires. Further, it is known that the higher the value, the better the wet grip property. In addition, the dynamic loss factor (tan δ@60° C.) at 60° C. is related to rolling resistance of tires. It is also known that the lower the value, the better the rolling resistance.

(2) Abrasion resistance index (A.R.I.) of the rubber molded products according to Preparation Examples 1 to 2 and Comparative Preparation Examples 1 to 2 was measured by an abrasion tester (Bareiss GmbH) in accordance with DIN ISO 4649.

The abrasion resistance index was calculated as {[(loss weight of the material) X (specific gravity of the material)]/[(loss weight of the reference material)×(specific gravity of the reference material)]}×100 (reference material: neutral rubber).

TABLE 4

|  | Prep. Ex. 1 | Prep. Ex. 2 | Comp. Prep. Ex. 1 | Comp. Prep. Ex. 2 |
|---|---|---|---|---|
| tan δ @0° C. | 0.9251 | 0.9442 | 0.9202 | 0.9382 |
| tan δ @60° C. | 0.1120 | 0.1063 | 0.1001 | 0.0967 |
| A.R.I. | 123.2 | 119.6 | 104.6 | 102.6 |

Referring to Table 4, it was confirmed that the rubber molded product according to Preparation Example 1 exhibited wet grip and rolling resistance characteristics similar to those of Comparative Preparation Example 1, and also had remarkably improved abrasion resistance.

The invention claimed is:

1. A method for preparing aluminosilicate particles, comprising:
curing a raw material mixture to obtain a solid product including aluminosilicate particles, wherein the raw material mixture comprises a basic or alkaline aqueous solution, a silicon source, and an aluminum source;
washing the solid product;
purifying the washed solid product to separate the aluminosilicate particles from unreacted silicon and aluminum sources, wherein the purification comprises:
dispersing the washed solid product in distilled water;
precipitating the unreacted silicon and aluminum sources base on weight difference;
obtaining a supernatant having the aluminosilicate particles; and
drying the supernatant to obtain the aluminosilicate particles.

2. The method for preparing aluminosilicate particles of claim 1,
wherein the silicon source is at least one compound selected from the group consisting of fumed silica, rice husk, colloidal silica, cellite, pearlite, rice husk ash, silica fume, organosilane, clay, minerals, meta kaolin, calcined clay, active clay, fly ash, slag, pozzolan, glass powder, and red mud; and
the aluminum source is at least one compound selected from the group consisting of alumina, aluminate, aluminum salt, organic aluminoxane, pearlite, clay, mineral, meta kaolin, calcined clay, active clay, fly ash, slag, pozzolan, glass powder, and red mud.

3. The method for preparing aluminosilicate particles of claim 1,
wherein the curing is carried out at a temperature of 20 to 90° C.

4. The method for preparing aluminosilicate particles of claim 1,
wherein the aluminosilicate particles are amorphous compounds having a composition of the following Chemical Formula 1:

$$M_{x/n}[(AlO_2)_x,(SiO_2)_y].m(H_2O) \quad \text{[Chemical Formula 1]}$$

wherein, in Chemical Formula 1,
M is an element selected from the group consisting of Li, Na, K, Rb, Cs, Be, and Fr, or an ion thereof;
x>0, y>0, n>0, and m>0;
1.0≤y/x≤5.0; and
0.5≤x/n≤1.2.

5. A reinforcing material for rubber comprising amorphous aluminosilicate particles having a composition of the following Chemical Formula 1,
wherein the aluminosilicate particles satisfy the following conditions:
in a data plot obtained by X-ray diffraction (XRD), a full width at half maximum (FWHM) in a 2θ range of 20° to 37° is 3° to 8.5°, a maximum peak intensity ($I_{max}$) is in a 2θ range of 26° to 31°, and the aluminosilicate particles exhibit a pattern having no peak of crystalline $SiO_2$ (JCPDS standard pattern number #46-1045),
an average particle diameter is 10 to 100 nm,
a Brunauer-Emmett-Teller surface area ($S_{BET}$) is 80 to 250 m²/g, and an external specific surface area ($S_{EXT}$) is 60 to 200 m²/g according to an analysis of nitrogen adsorption/desorption:

$$M_{x/n}[(AlO_2)_x,(SiO_2)_y].m(H_2O) \quad \text{[Chemical Formula 1]}$$

wherein, in Chemical Formula 1,
M is an element selected from the group consisting of Li, Na, K, Rb, Cs, Be, and Fr, or an ion thereof;
x>0, y>0, n>0, and m>0;
1.0≤y/x≤5.0; and
0.5≤x/n≤1.2.

6. The reinforcing material for rubber of claim 5,
wherein the aluminosilicate particles satisfy 0.8≤$S_{EXT}$/$S_{BET}$≤1.0.

7. The reinforcing material for rubber of claim 5,
wherein the aluminosilicate particles have a volume ($V_{micro}$) of micropores having a pore size of less than 2 nm calculated from the $S_{BET}$ by a t-plot method of less than 0.05 cm³/g.

8. The reinforcing material for rubber of claim 5,
wherein the aluminosilicate particles have a particle size distribution which shows a volume average particle diameter ($D_{mean}$) of 1 to 25 µm, a geometric standard deviation of 1 to 20 µm, and a 90% cumulative particle diameter ($D_{90}$) of 1 to 100 µm, when measured under distilled water.

9. A rubber composition for tires comprising the reinforcing material for rubber of claim 5 and at least one diene elastomer.

10. The rubber composition for tires of claim 9,
wherein the diene elastomer is at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

* * * * *